(12) United States Patent
Nguyen et al.

(10) Patent No.: US 9,151,896 B2
(45) Date of Patent: Oct. 6, 2015

(54) RIBBON FIBER HOLDER FOR LARGE DIAMETER CABLES AND LOOSE FIBERS AND ASSOCIATED METHODS

(71) Applicant: US Conec, Ltd., Hickory, NC (US)

(72) Inventors: Hiep Nguyen, Fort Hill, SC (US); Darrell R. Childers, Hickory, NC (US); Michael E. Hughes, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 336 days.

(21) Appl. No.: 13/783,202

(22) Filed: Mar. 1, 2013

(65) Prior Publication Data

US 2013/0243385 A1 Sep. 19, 2013

Related U.S. Application Data

(60) Provisional application No. 61/605,700, filed on Mar. 1, 2012.

(51) Int. Cl.
*G02B 6/00* (2006.01)
*G02B 6/25* (2006.01)
*G02B 6/245* (2006.01)

(52) U.S. Cl.
CPC . *G02B 6/25* (2013.01); *G02B 6/245* (2013.01)

(58) Field of Classification Search
CPC .......................................................... G02B 6/25
See application file for complete search history.

(56) References Cited

U.S. PATENT DOCUMENTS 5,829,659 A * 11/1998 Mansfield et al. ................. 225/2
2003/0198454 A1* 10/2003 Chiang et al. ................. 385/137

* cited by examiner

*Primary Examiner* — Uyen Chau N Le
*Assistant Examiner* — Chad Smith
(74) *Attorney, Agent, or Firm* — Michael L. Leetzow

(57) ABSTRACT

A cable holding tool for holding optical fiber ribbons relative one another for preparation has a cable holding portion and an optical fiber holding portion, each having a cover and an opening therein to receive an optical cable and a fiber optic ribbon respectively. The cable holding tool also has at least one channel disposed between the cable holding portion and the optical fiber holding portion to receive and divert at least one optical fiber ribbon from the optical cable disposed in the cable holding portion from the optical fiber holding portion. A spacer is also provided that is movable parallel to the optical fiber groove from a first position to at least one second position to assist in staggering the fiber ribbons.

9 Claims, 11 Drawing Sheets

RIBBON FIBER HOLDER FOR LARGE DIAMETER CABLES AND LOOSE FIBERS AND ASSOCIATED METHODS

REFERENCE TO RELATED CASE

This application claims priority under 35 U.S.C. §119 (e) to provisional application No. 61/605,700, filed on Mar. 1, 2012, which is hereby incorporated by reference in its entirety.

BACKGROUND OF THE INVENTION

Field of the Invention

Ribbon clips are used in the industry to hold optical fibers that are being prepared for insertion into fiber optic ferrules. These typically press down on the ribbons and the jacket that surrounds the ribbons. However, the optical fibers and ribbons are being produced in larger cables that are not amenable to the older ribbon clips. The cables are a new high fiber count, large outside diameter, jacketed round cable. These cables may have multiple fiber optic ribbons disposed inside the cable, or they may have individual optical fibers, making it difficult to be able to secure the optical fiber ribbons relative to the cable jacket. Additionally, these stiff cables are not strain-relieved, making it difficult to perform the fiber stripping and cleaving necessary to attach a multi-fiber, multi-row ferrule on the optical fibers.

Additionally, it is preferable to have staggered length between each of the optical fiber ribbons at the end of the fiber optic cable to allow for easier insertion into a multi-row ferrule. The staggered length allows the operator to insert one ribbon at a time into the front of each micro-hole in the respective row in the multi-row ferrule. Typically the bottom ribbon is the longest relative to the other ribbons and is inserted first into the multi-row ferrule. The next ribbon (right above the bottom or second to bottom ribbon) is then installed into the multi-row ferrule, and this continues until all of the ribbons have been installed. However, if the fiber optic cable is not strain relieved relative to the optical fiber, then the staggered lengths of the ribbons will be difficult to maintain. Currently, a loose spacer with incremental thicknesses are used with a ribbon stripping tool or a fiber cleaver or both. Using a loose spacer in staggering the ribbons also has its problems. It is difficult to be consistent with the stagger when the loose spacer moves during the stripping or cleaving process.

Thus, a holder tool is needed that can hold the optical fiber ribbons and allow for trimming of the different ribbons at different lengths in a safe and consistent manner.

SUMMARY OF THE INVENTION

The present invention is directed to a cable holding tool for holding optical fiber ribbons relative one another for preparation that includes a cable holding portion, the cable holding portion having a channel therein to receive a fiber optic cable, an optical fiber holding portion, the optical fiber holding portion having a optical fiber groove for a single row of optical fibers from the fiber optic cable, a first cover associated with the cable holding portion and having an elastic portion on an underside to engage a fiber optic cable disposed in the channel of the cable holding portion when the first cover is closed, a second cover associated with the optical fiber holding portion and having an elastic portion on an underside thereof to engage optical fibers disposed in the optical fiber holding portion when the second cover is closed, at least one channel disposed between the cable holding portion and the optical fiber holding portion, the at least one channel configured to receive and divert at least one optical fiber ribbon from the optical cable disposed in the cable holding portion from the optical fiber holding portion, and a spacer disposed in a portion of the optical fiber holding portion and having a front surface, the spacer movable parallel to the optical fiber groove from a first position to at least one second position, the front surface of the spacer being beyond a front edge of the optical fiber holder portion in the at least one second position.

In some embodiments, the spacer comprises a main body, an elastic member, and a housing, the elastic member disposed between the main body and the housing.

In some embodiments, the spacer is movable relative to the optical fiber holding portion in discrete steps, the discrete steps corresponding to a stagger of the optical fibers in the fiber optic cable.

In yet other embodiments, the main body of the spacer has at least one projection on opposites thereof and the opening in the bottom has a plurality of notches corresponding to the at least one projection on the main body of the spacer, the at least one projection engaging the notches to prevent the spacer from moving during use.

In yet another aspect, the invention is directed to method of preparing the ends of optical fibers in a multi-ribbon fiber optic cable, the method including securing the multi-ribbon fiber optic cable in a channel in a first portion of a cable holding tool, securing one fiber optic ribbon from the multi-ribbon fiber optic cable in a groove in a second portion of the cable holding tool, positioning remaining fiber optic ribbons from the multi-ribbon fiber optic cable in a channel in the cable holding tool, the channel being generally orthogonal to the channel and the groove, adjusting a spacer disposed in the cable holding tool, the spacer movable relative to the cable holding tool to provide a reference point for the preparation of the optical fibers in the fiber optic ribbon secured in the groove, preparing the ends of the optical fiber for insertion into a fiber optic ferrule, and repeating the second through fifth steps with each of the other fiber optic ribbons in the multi-ribbon fiber optic cable.

In yet another aspect, the present invention is directed to cable holding tool for holding optical fiber ribbons relative one another for preparation that includes a cable holding portion, the cable holding portion having a channel therein to receive a fiber optic cable, an optical fiber holding portion, the optical fiber holding portion having a optical fiber groove for a single row of optical fibers from the fiber optic cable and at least one fiber alignment portion, a first cover associated with the cable holding portion and having an elastic portion on an underside to engage a fiber optic cable disposed in the channel of the cable holding portion when the first cover is closed, a second cover associated with the optical fiber holding portion and having an elastic portion on an underside thereof to engage optical fibers disposed in the optical fiber holding portion when the second cover is closed, and a fiber alignment block, the rotatably disposed in the optical fiber holding portion, the fiber alignment block having an opening to orient the optical fibers in an array.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
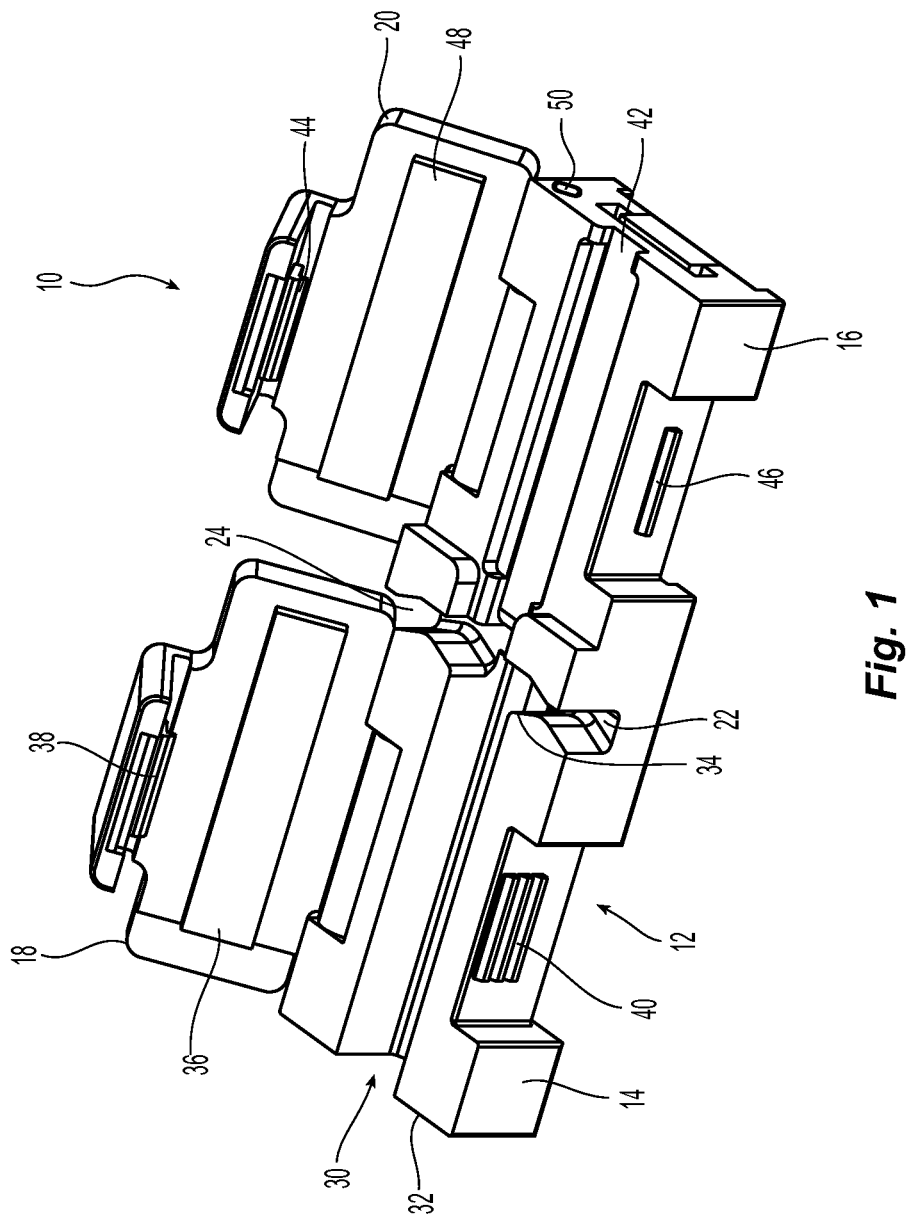
FIG. 1 is a top, front perspective view of one embodiment of a cable holding tool according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Referring to the figures, a cable holding tool 10 has a base portion 12 that is divided into a cable holding portion 14 and an optical fiber holding portion 16. The cable holding portion 14 has a first cover 18 and the optical fiber holding portion 16 has a second cover 20. The cable holding tool 10 and the first and second covers 18,20 are preferably molded from a plastic material. The cable holding portion 14 and the optical fiber holding portion 16 are preferably molded as a single, integral piece to form base 12. However, they could be molded and/or manufactured as separate pieces and joined together. On each side of the cable holding tool 10 and between the cable holding portion 14 and the optical fiber holding portion 16 is a fiber management channel 22,24. As discussed in detail below and with reference to FIG. 4, the fiber management channels 22,24 are used to position the fiber-optic ribbons that are not being prepared so that they do not interfere with the fiber-optic ribbon that is being worked on.

The cable holding portion 14 has a channel 30 that extends from the back end 32 to the front and 34 to receive a fiber-optic cable 100. See FIG. 4. The fiber-optic cable 100 generally includes a cable jacket 102 having an outer diameter of between 4 and 6 mm and contain between one and six fiber optic ribbons 104 (between 12 and 72 optical fibers). In order to strain relieve the fiber optic cable 100, the first cover 18 is closed over the fiber optic cable. Inserted into the first cover 18 is an elastomer molded pad 36 that engages and compresses the fiber optic cable into the channel 30, thereby strain relieving the fiber optic cable. The first cover 18 has a latch 38 to engage one of several corresponding notches (or projections) 40 on the cable holding portion 14. As would be understood by one of ordinary skill in the art, a smaller fiber-optic cable would require the first cover 18 to engage one of the lower notches 40 on the cable holding portion 14. Naturally, the exact position of the first cover 18 with respect to the cable holding portion 14 will depend upon the outer diameter of the cable jacket, the modulus of the cable jacket, and the number of optical fiber ribbons present in the fiber-optic cable. See FIG. 5.

One of the fiber-optic ribbons 104 from the fiber optic cable 100 secured in the cable holding portion 14 is disposed in an optical fiber groove 42 in the optical fiber holding portion 16. See also FIG. 4. The second cover 20 is closed over the fiber optic ribbon disposed in the optical fiber groove 42. A latch 44 engages a corresponding notch (or projection) 46 on the fiber optic holding portion 16. The second cover 20 also includes an elastomer molded pad 48 to compress and hold the fiber optic ribbon in the optical fiber groove 42. It should be noted that only one notch 46 is illustrated on the optical fiber holding portion 16. Since only one optical fiber ribbon will be prepared at a time, there should be no variation in the height of the optical fiber ribbons disposed in the optical fiber group 42. However, more notches 44 may be provided and still come within the scope of the present invention.

Figure 3:
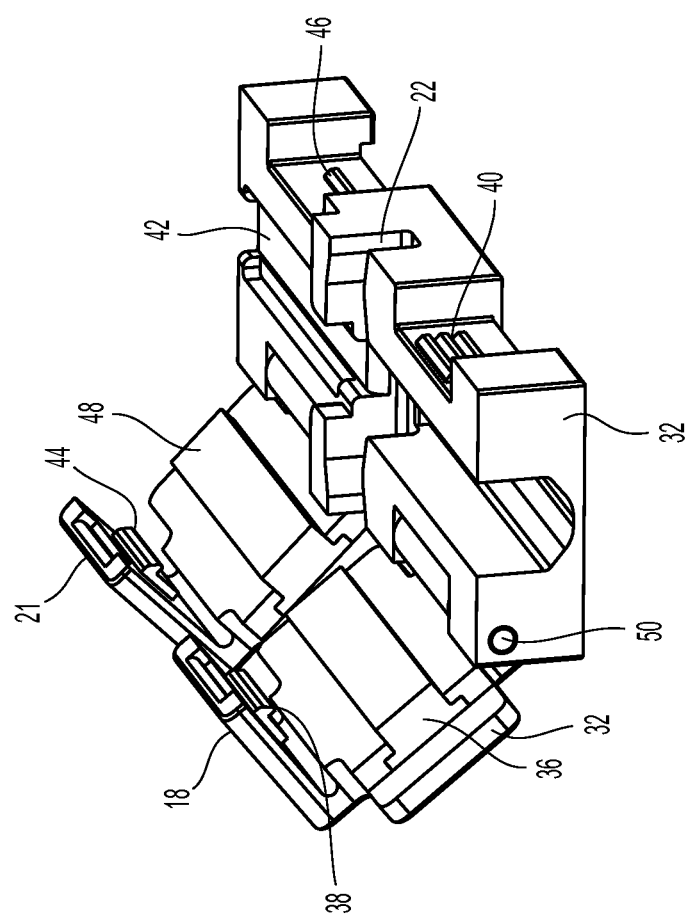
FIG. 3 is an end perspective view of the cable holding tool of FIG. 1.

With reference to FIG. 3, the first and second covers 18, 20 are attached to the respective portions of the base 12 using a pin/dowel 50. Additionally, the elastomer molded pads 36, 48 generally have a T-shape and are inserted into the first and second covers 18, 20 from the rear side of the table holding tool 10. The shape and the method and/or manner of attaching the elastomer molded pads 36, 48 to the first and second covers 18, 20 are not critical. The elastomer molded pads 36, 48 are preferably designed of 50D duro-meter hardness and have an interference of 0.100-0.140 mm with the ribbon fiber. This allows for maintaining pressure on the fibers and sufficient friction the thermal-strip pulling action for preparing the ends of the optical fibers.

Figure 4:
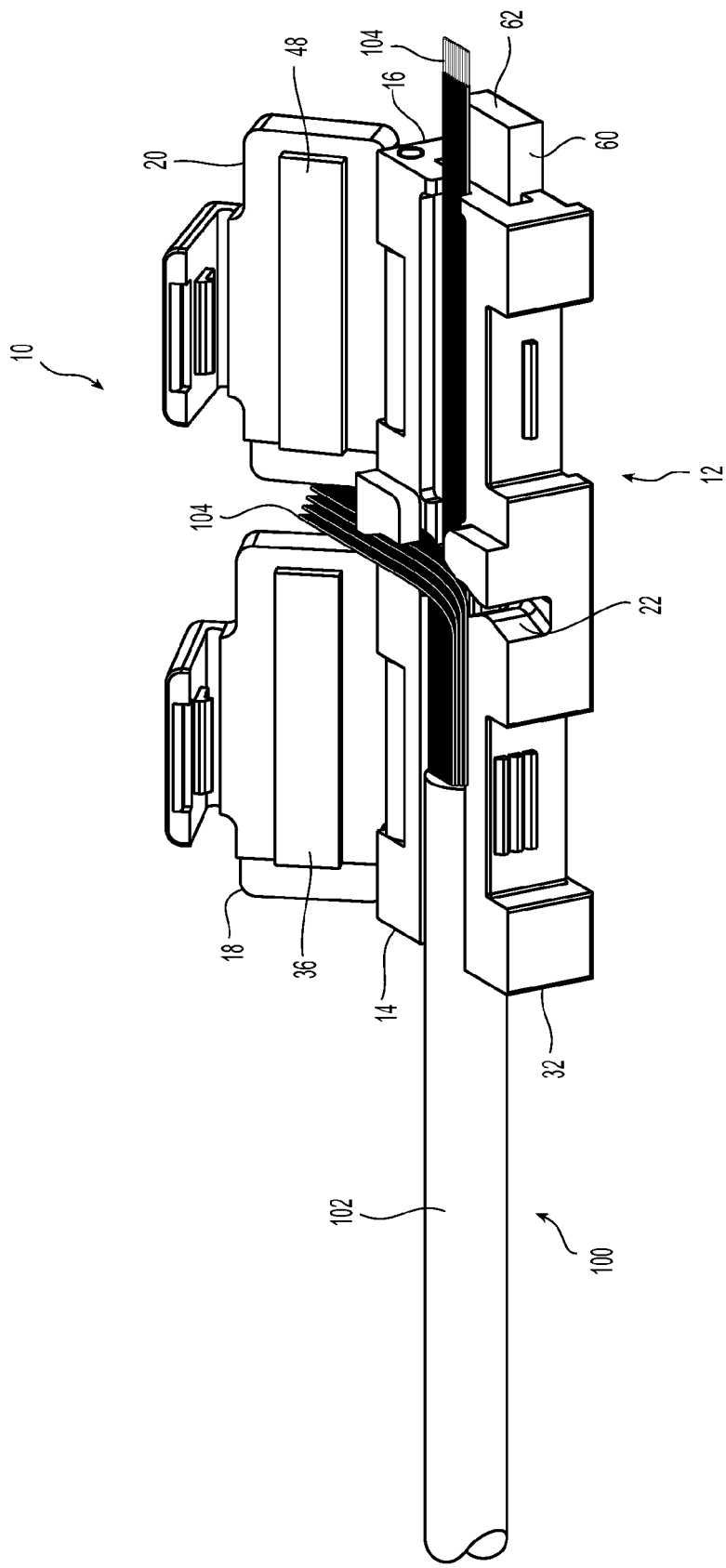
FIG. 4 is a top perspective view of the cable holding tool of FIG. 1 with a fiber optic cable and fiber ribbons disposed therein.
Figure 5:
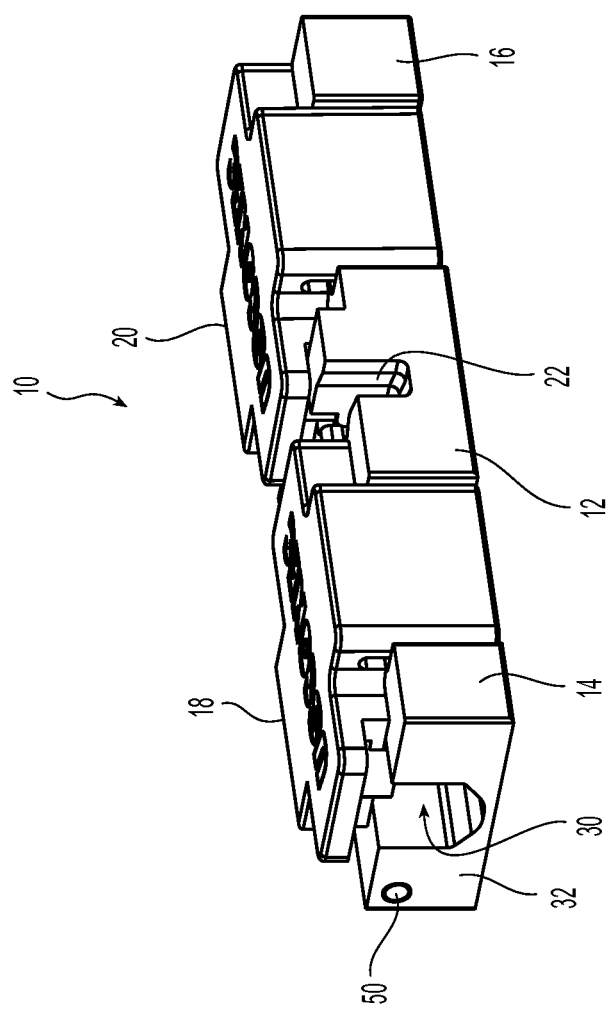
FIG. 5 is a perspective view of the cable holding tool of FIG. 1 in a closed position.
Figure 7:
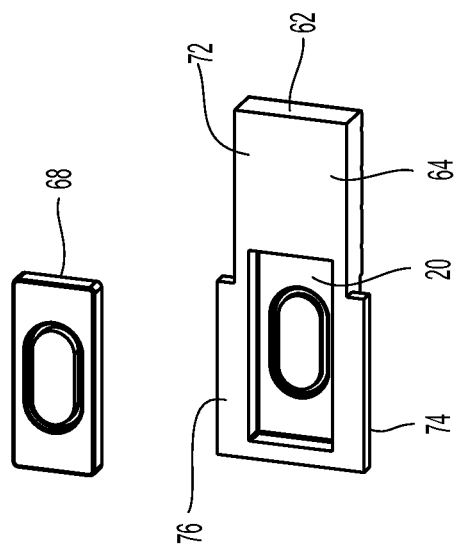
FIG. 7 is an exploded view of the spacer of FIG. 6.
Figure 6:
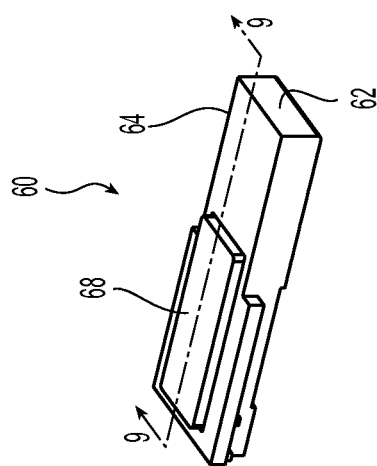
FIG. 6 is a perspective view of spacer used with the cable holding tool of FIG. 1.

The other fiber-optic ribbons are, as illustrated in FIG. 4, routed to and through the fiber management channels 22,24. The bend radius of the optical fibers will allow such a manipulation of the fibers without any concern. The fiber-optic ribbons managed in this way will allow for unfettered access to the one secured in the optical fiber holding portion 16. Once one of the fiber-optic ribbons have been prepared, it is removed from the optical fiber holding portion 16 and routed to one of the fiber management channels 22,24. Then another of the fiber-optic ribbons is secured and prepared in the same way.

Figure 2:
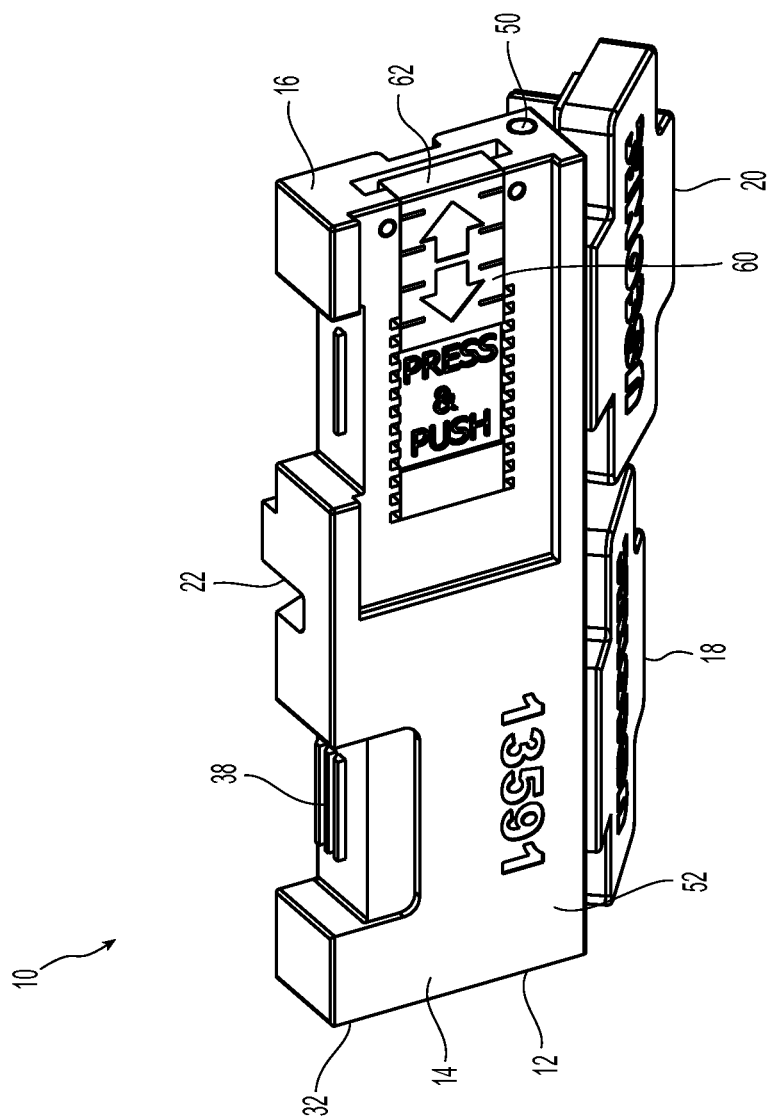
FIG. 2 is a bottom perspective view of the cable holding tool of FIG. 1.

Referring to FIG. 2, a bottom surface 52 of the base portion 12 is illustrated. In the optical fiber holding portion 16 is a spacer 60. The spacer 60 has a front surface 62 that is used as a reference point when preparing the ends of the optical fibers in the fiber-optic ribbons. As discussed below in further detail with reference to FIGS. 6-9, the spacer 60 can be pushed in (i.e., upward toward the optical fiber groove 42) and then moved to the appropriate position relative to the optical fiber holding portion 16. When the spacer 60 is released it reengages the cable holding tool 10 to remain in its new position.

Figure 8:
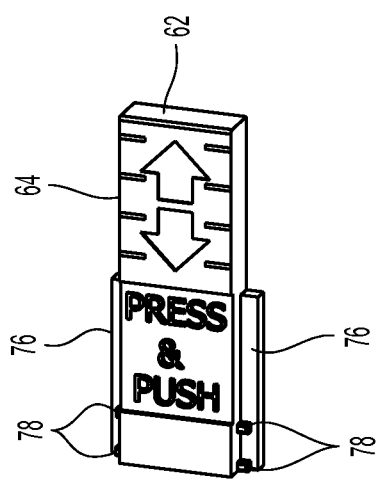
FIG. 8 is a perspective view of the main body of the spacer of FIG. 6.
Figure 9:
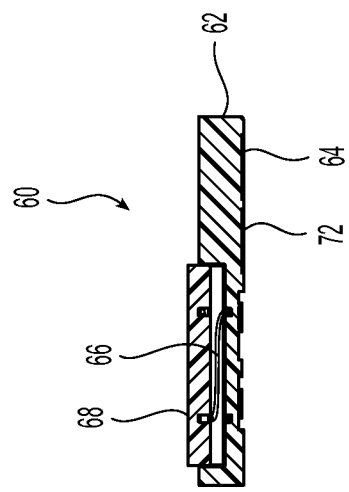
FIG. 9 is a cross section view of the spacer of FIG. 6.
Figure 10:
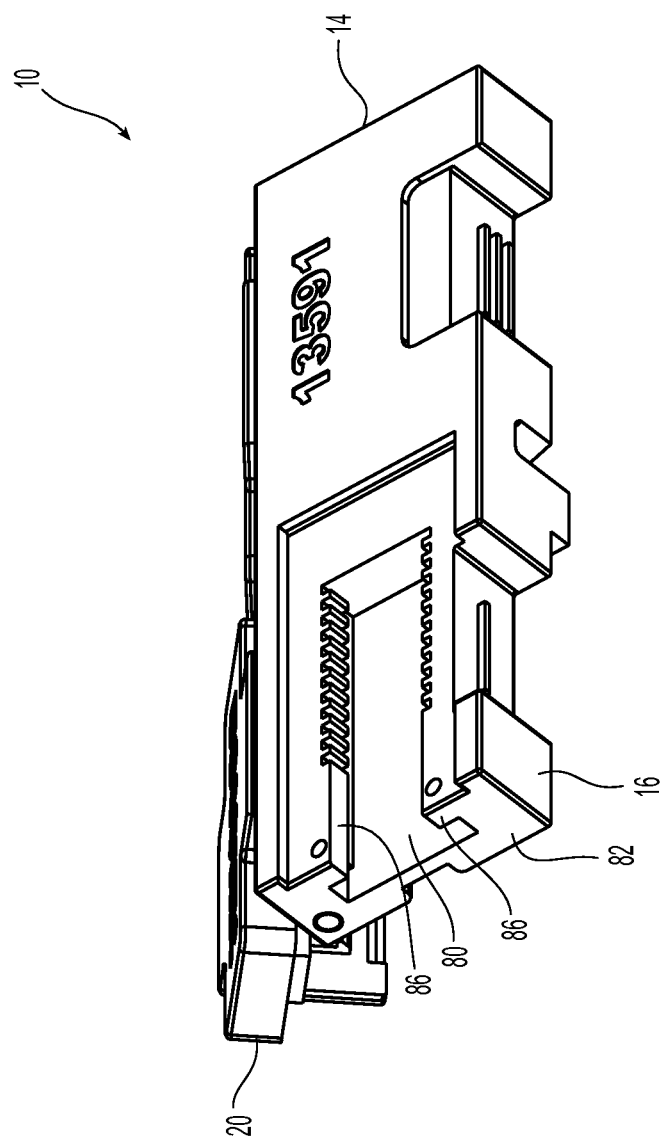
FIG. 10 is a bottom view of the cable holding tool with the spacer removed.
Figure 11:
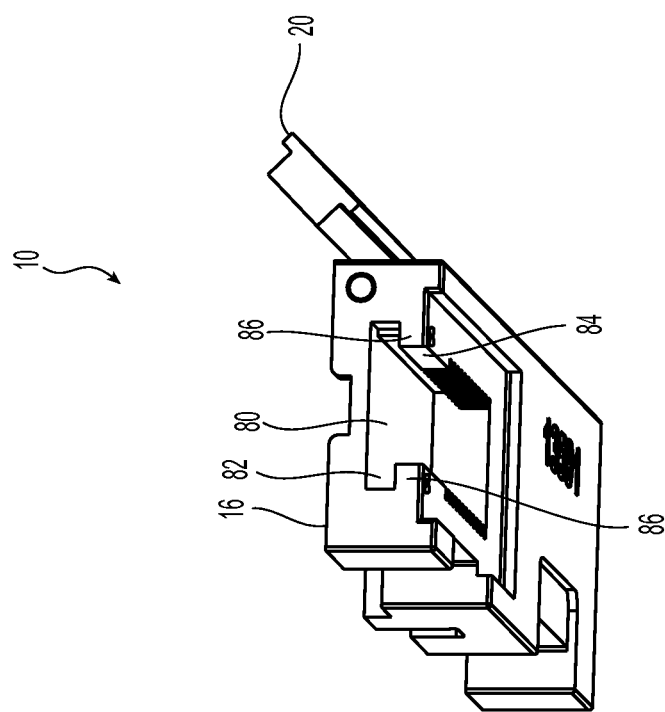
FIG. 11 is a front view of cable holding tool with the spacer removed.
Figure 12:
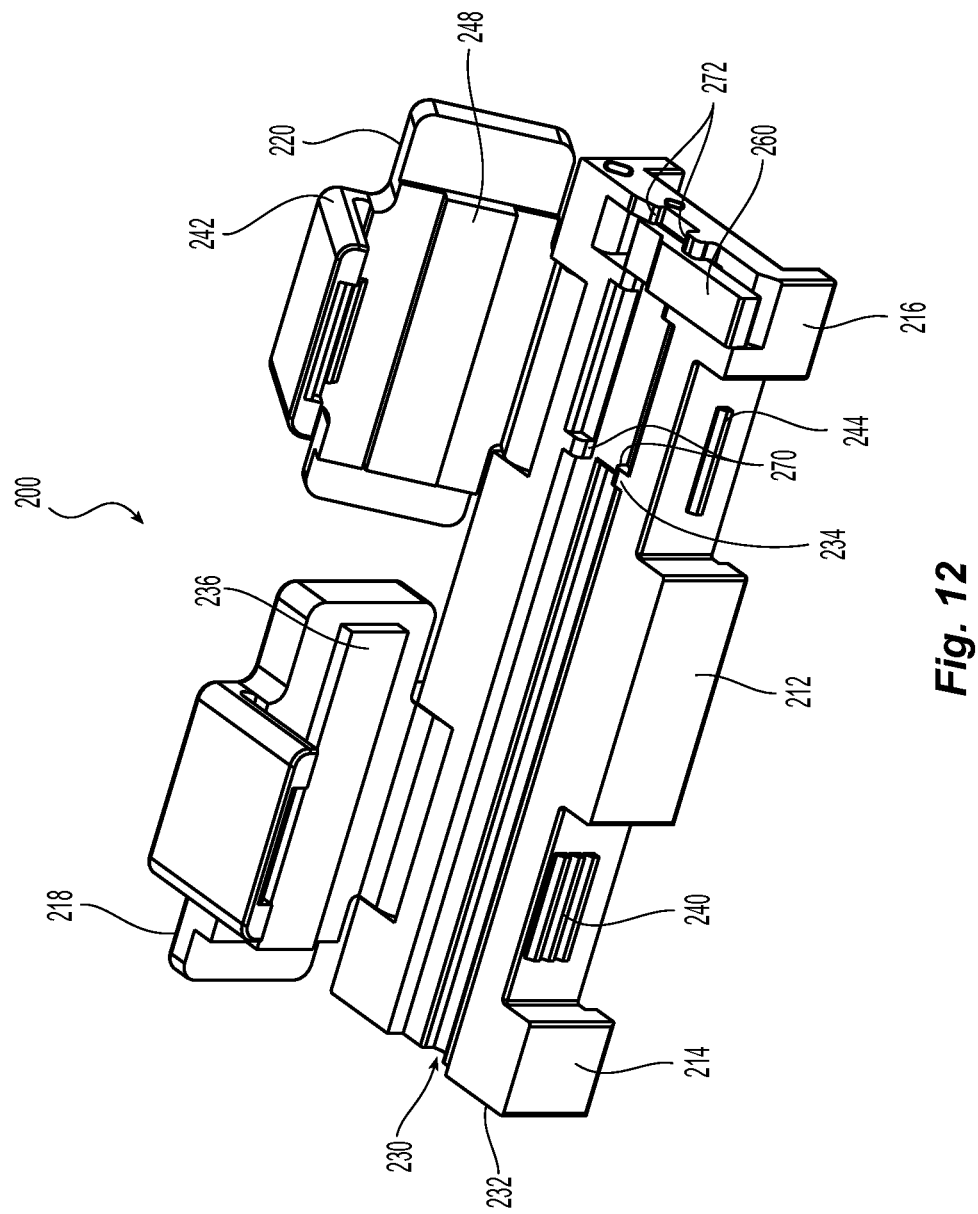
FIG. 12 is top, front perspective view of another embodiment of a cable holding tool according to the present invention.

With reference to FIGS. 6-9, the spacer 60 comprises a main body 64, an elastic member 66 and a housing 68. The elastic member 66 is disposed between the main body 64 and the housing 68. Preferably, the main body 64 and the housing 68 are independent of one another. Both the main body 64 and the housing 68 have a groove that corresponds to the configuration of the elastic member 66. As illustrated herein, the elastic member 66 is preferably an oval coil spring. However, other configurations and indeed other elastic components could be used as elastic number 66 rather than the oval coil spring. The main body 64 has a cavity 70 in a rear surface 72 into which the housing 68 fits. The main body 64 has two flanges 74,76 extending from the opposing sides to engage the optical fiber holding portion 16. As best illustrated in FIG. 8, each of the flanges 74, 76 have projections extending upward from the flanges 74, 76 and outward from the sides of the main body 64. As illustrated in FIGS. 10 and 11, the optical fiber holding portion 16 has an opening 80 that extends from the front 82 rearwardly toward the cable holding portion 14. The opening 80 has a wider portion 82 and a narrower portion 84, which extends through the bottom surface 52. As best seen in FIG. 12, a portion 86 of the optical fiber holding portion 16 extends inwardly on both sides of opening 80 to create the narrow portion 84 of opening 80. The portions 86 each have notches 88 that cooperate with the projections 78 on the spacer 60. In order for the front surface 62 of the spacer 60 to operate as a reference point, the operator presses on spacer 60 (and in particular main body 64), the main body 64 compresses the elastic member 66 and the projections 78 are disengaged from the notches 88. The operator can then move the spacer 60 (including housing 68) relative to the optical fiber holding portion (and, in particular, the opening 80) so that the front surface 62 of the spacer 60 is located at the appropriate distance from the front 82 of the optical fiber holding portion. The front surface 62 then provides the reference point for the stripping and cleaning of the optical fibers security in the optical fiber holding portion 16.

Figure 13:
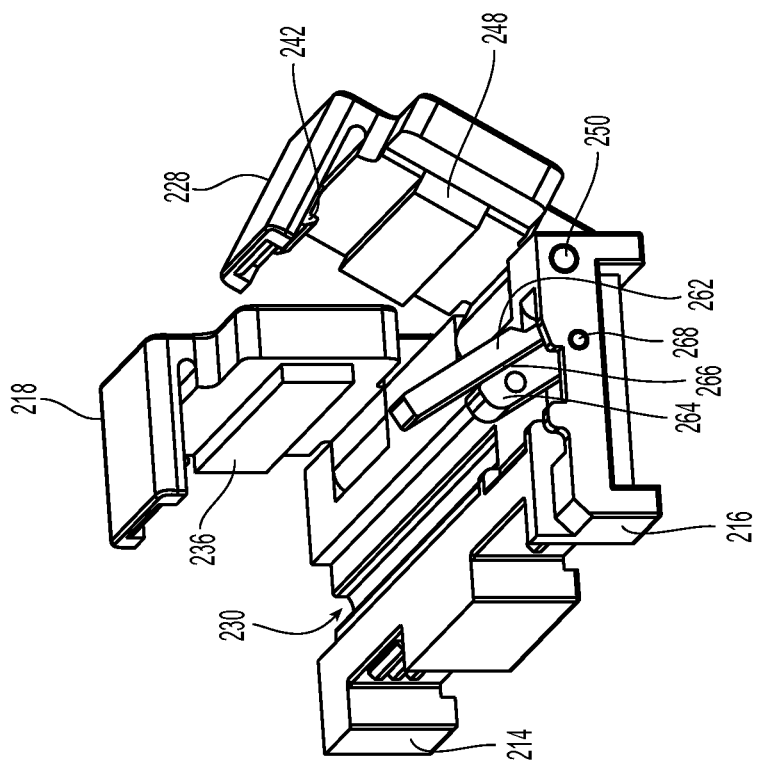
FIG. 13 is a partial view of the cable holding tool of FIG. 12 showing detail of the fiber stack block.

Another embodiment of a cable holding tool 200 is illustrated in FIGS. 12 and 13. The cable holding tool 200 has a base portion 212 that is divided into a cable holding portion 214 and an optical fiber holding portion 216. The cable holding portion 214 has a first cover 218 and the optical fiber holding portion 216 has a second cover 220. The cable holding tool 210 and the first and second covers 218,220 are preferably molded from a plastic material. The cable holding portion 214 and the optical fiber holding portion 216 are preferably molded as a single, integral piece to form base 212. The cable holding portion 214 has a channel 230 that extends from the back end 232 to the front and 234 to receive a fiber-optic cable with a single optical fiber ribbon. In order to strain relieve the fiber optic cable, the first cover 218 is closed over the fiber optic cable. Inserted into the first cover 218 is an elastomer molded pad 236 that engages and compresses the fiber optic cable into the channel 230, thereby strain relieving the fiber optic cable. The first cover 218 has a latch (not seen) as with the prior embodiment to engage one of several corresponding notches (or projections) 240 on the cable holding portion 214.

The fiber-optic ribbon from the fiber optic cable secured in the cable holding portion 214 is disposed in an optical fiber groove 242 in the optical fiber holding portion 216. The second cover 220 is closed over the fiber optic ribbon disposed in the optical fiber groove 242. A latch 244 engages a corresponding notch (or projection) 246 on the fiber optic holding portion 216. The second cover 220 also includes an elastomer molded pad 248 to compress and hold the fiber optic ribbon in the optical fiber groove 242. It should be noted that only one notch 246 is illustrated on the optical fiber holding portion 216. Since only one optical fiber ribbon will be prepared at a time, there is no variation in the height of the optical fiber ribbons disposed in the optical fiber groove 242. However, more notches 244 may be provided and still come within the scope of the present invention.

The cable holding tool 200 also includes a fiber stack block 260 at the end of the optical fiber groove 242. The fiber stack block 260 has an upper portion 262 and a lower portion 264 defining an opening or slot 266. The upper portion 262 is preferably longer than the lower portion 264 thereby providing a handle to assist in rotation of the fiber stack block about pin 266. Optical fibers are inserted into the slot 266, preferably in color order. After the optical fibers are inserted into slot 266, the fiber stack block 260 is rotated downward so that the optical fibers lie in the optical fiber groove 242. The fibers will also be positioned within two sets of fiber guards 270, 272. The first set of fiber guards 270 are positioned between the channel 230 and the optical fiber groove 242. The fiber guards 270 are two upwardly extending surfaces that protect the optical fibers from the two covers and ensure that the optical fibers are positioned within the optical fiber groove 242. The fiber guards 272 are at the front end of the optical fiber holding portion 216 adjacent the fiber stack block 260.

At this point, with the first cover 218 having already been secured over the fiber optic cable and the optical fibers in the optical fiber groove 242, the second cover 220 is closed securing the optical fibers therein. The optical fibers, extending beyond the front end of the optical fiber holding portion 216, are now ready to be stripped and cleaved.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A cable holding tool for holding optical fiber ribbons relative one another for preparation comprising:
    a cable holding portion, the cable holding portion having a channel therein to receive a fiber optic cable;
    an optical fiber holding portion, the optical fiber holding portion having a optical fiber groove for a single row of optical fibers from the fiber optic cable;
    a first cover associated with the cable holding portion and having an elastic portion on an underside to engage a fiber optic cable disposed in the channel of the cable holding portion when the first cover is closed;
    a second cover associated with the optical fiber holding portion and having an elastic portion on an underside thereof to engage optical fibers disposed in the optical fiber holding portion when the second cover is closed; and
    at least one channel disposed between the cable holding portion and the optical fiber holding portion, the at least one channel configured to receive and divert at least one optical fiber ribbon from the fiber optical cable disposed in the cable holding portion from the optical fiber holding portion.

2. The cable holding tool according to claim 1, further comprising a spacer disposed in a portion of the optical fiber holding portion and having a front surface, the spacer movable parallel to the optical fiber groove from a first position to at least one second position, the front surface of the spacer being beyond a front edge of the optical fiber holder portion in the at least one second position.

3. The cable holding tool according to claim 2, wherein the spacer comprises a main body, an elastic member, and a housing, the elastic member disposed between the main body and the housing.

4. The cable holding tool according to claim 2, wherein the optical fiber holding portion has an opening extending from a front face rearwardly toward the cable holding portion and extending through a bottom surface thereof, the spacer disposed within the opening in the optical fiber holding portion and extending through the bottom surface.

5. The cable holding tool according to claim 4, wherein the housing is disposed within opening and the main body is disposed with the opening and extending through the bottom surface of the optical fiber holding portion, the main body biased against the optical fiber holding portion by the elastic member.

6. The cable holding tool according to claim 2, wherein the spacer is movable relative to the optical fiber holding portion in discrete steps, the discrete steps corresponding to a stagger of the optical fibers in the fiber optic cable.

7. The cable holding tool according to claim 4, wherein the opening through the front face has a wider portion and a smaller portion, the smaller portion corresponding to the opening through the bottom surface.

8. The cable holding tool according to claim 3, wherein the main body of the spacer has at least one projection on opposites thereof and the opening in the bottom has a plurality of notches corresponding to the at least one projection on the main body of the spacer, the at least one projection engaging the notches to prevent the spacer from moving during use.

9. The cable holding tool according to claim 8, where the spacer can be moved relative to the optical fiber holding portion by pressing the spacer toward the optical fiber holding portion to disengage the at least one projection from the notches and sliding the spacer to a new location and releasing the spacer thereby allowing the elastic member to bias the main body of the housing against the optical fiber holding portion.

* * * * *